United States Patent [19]
Ikegami et al.

[11] Patent Number: 5,113,105
[45] Date of Patent: May 12, 1992

[54] ROTOR FOR MINIATURE MOTORS

[75] Inventors: Masakazu Ikegami; Ryouichi Someya, both of Matsudo, Japan

[73] Assignee: Mabuchi Motor Co., Ltd., Chiba, Japan

[21] Appl. No.: 605,228

[22] Filed: Oct. 26, 1990

[30] Foreign Application Priority Data

Oct. 30, 1989 [JP] Japan .............................. 1-126882[U]

[51] Int. Cl.[5] .......................................... H02K 13/00
[52] U.S. Cl. ..................................... 310/233; 310/42; 310/45; 310/91; 310/236; 310/261
[58] Field of Search ................................. 310/233–237, 310/40 MM, 42, 43, 45, 91, 219, 231, 232, 261, 269, 198; 29/597

[56] References Cited

U.S. PATENT DOCUMENTS

| | | | |
|---|---|---|---|
| 1,901,955 | 3/1933 | Giamo | 29/597 |
| 3,568,309 | 3/1971 | Preece | 29/597 |
| 3,861,027 | 1/1975 | Allen | 310/234 |
| 3,917,967 | 11/1975 | Robison et al. | 310/42 |
| 4,668,888 | 5/1987 | Tamura et al. | 310/233 |

*Primary Examiner*—R. Skudy
*Attorney, Agent, or Firm*—McGlew & Tuttle

[57] ABSTRACT

A rotor for miniature motors having a shaft serving as a rotating shaft, a commutator having commutator segments mounted on a commutator proper fixedly fitted to the shaft, a rotor core fixedly fitted to the shaft and having rotor windings wound thereon, a plurality of positioning bosses formed in such a manner as to protrude toward the side of the rotor core on the commutator proper, and a positioning groove, formed on the side surface of the rotor core, into which the positioning bosses are inserted; the commutator being fixedly fitted by press-fitting the positioning bosses into the positioning groove, characterized in that
positioning grooves which are formed on the side surface of the rotor core, and smaller in number than the number of the positioning bosses,
a long positioning boss, among a plurality of the positioning bosses, having a sufficient length to be press-fitted into the positioning grooves,
other short positioning bosses having a length at least equal to the thickness of an insulating core fitted to the side surface of the rotor core are provided;
the long positioning boss being press-fitted into the positioning groove, and said commutator is fixedly fitted to the shaft in a state where the tips of the short positioning bosses are brought into contact with the side surface of the rotor core.

6 Claims, 2 Drawing Sheets

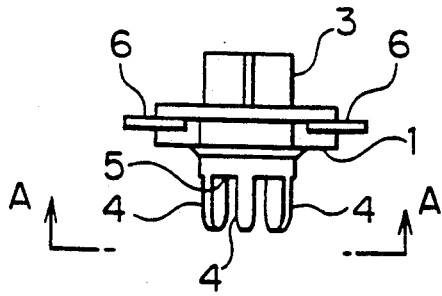
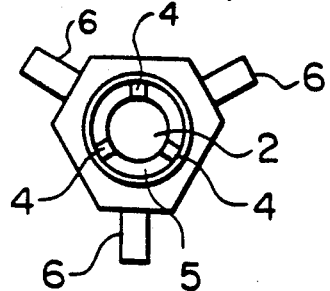
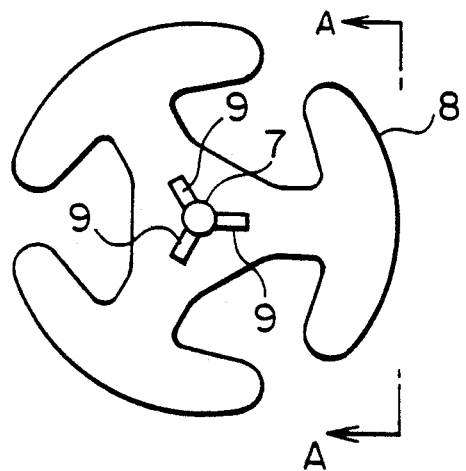
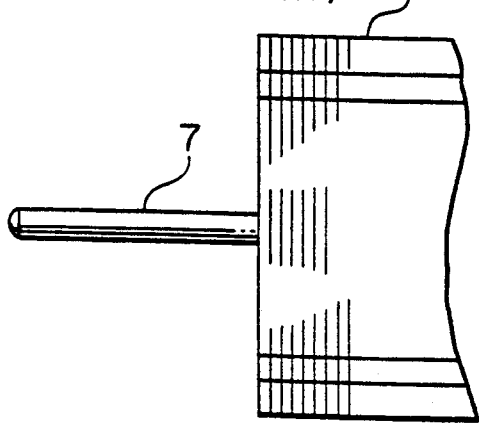
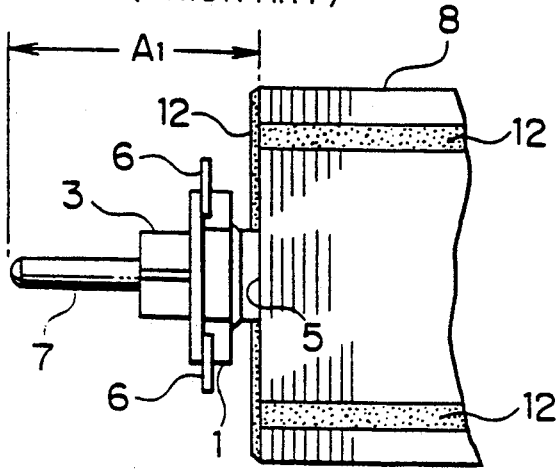
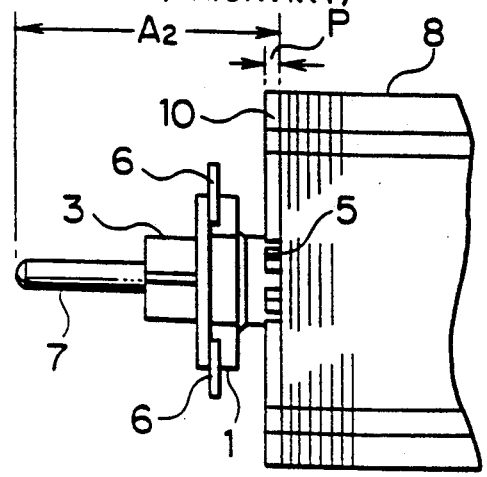

ROTOR FOR MINIATURE MOTORS

BACKGROUND OF THE INVENTION

This invention relates generally to a rotor core miniature motors in which positioning bosses, made of an insulating material, such as a synthetic resin, are provided on a commutator proper on which commutator segments are mounted, and the commutator is fixedly fitted by press-fitting the positioning bosses into positioning grooves provided on the side surface of a rotor core.

DESCRIPTION OF THE PRIOR ART

A commutator of the prior-art miniature motors is made of an insulating material, such as a synthetic resin, and has a shaft-inserting hole 2. Commutator segments 3 are mounted on one side of a commutator proper 1, and a plurality of positioning bosses 4,—are formed on the other side of the commutator proper 1 in such a manner as to protrude outwards outwards. FIG. 5(A) is a front view of a commutator, FIG.(B) is a bottom view thereof. Numeral 5 in the figures refers to a boss bottom, and 6 to a commutator terminal.

A rotor of the prior-art miniature motors consists of a rotor core 8 formed by press-fitting (staking) laminated cores into a shaft 7, as shown in FIGS. 6(A) and (B). FIG. 6(A) is a front view of a rotor core, viewed from the direction of the shaft 7, and FIG. 6(B) is a partial side view thereof. As shown in FIG. 6(A), a plurality of positioning grooves 9, —into which a plurality of positioning bosses 4, —are press-fitted are formed on the side surface of a rotor core 8.

The commutator is fixedly fitted to the shaft 7 by inserting the shaft 7 into the shaft-interting hole 2, and press-fitting and staking the positioing bosses, —into the positioning grooves 9—. This state is shown in FIGS. 7 and 8. The prior art shown in FIG. 7 is a rotor for miniature motors in which resin coating 12 is applied onto the surface of the rotor core 8, except the outer circumferential surface thereof, and the commutator is fixedly fitted in such a state where the boss bottom 5 is brought into contact with the side surface of the rotor core 8. The prior art shown in FIG. 8 is a rotor for miniature motors in which an insulating core 10 is fitted to the side surface of the rotor core 8, and the commutator is fixedly fitted in such a state where the boss bottom 5 is brought into contact with the insulating core 10. The insulating core 10 is an insulating board provided in such a manner as to cover the end face of the rotor core 8.

Needless to say, the rotor for miniature motors consists of rotor windings (not shown) wound on the resin coating 12 (refer to the prior art shown in FIG. 7) or a rotor core 8, and an insulating core 10 (refer to the prior art shown in FIG. 8), the ends of the rotor windings being connected to the commutator terminals 6—.

In the rotors of the prior-art miniature motors described with reference to FIG. 5 through 8, the distance from the left end (in FIGS. 7 and 8) of the shaft 7 to the side surface of the rotor core 8 (this distance is hereinafter referred to as "positioning length") is different between the rotor shown in FIG. 7, to which resin coating 12 is applied, and the rotor shown in FIG. 8, to which an insulating core 10 is fitted. That is, the difference in the positioning length causes the position of the commutator segments 3 to be shifted. To prevent the positon of the commutator segments 3 from being shifted, two different types of the rotor core 8 having the varied thicknesses of the laminates have to be provided.

That is, in the prior art shown in FIG. 7, the commutator is fixedly fitted in such a state where the boss bottom 5 is brought into contact with the side surface of the rotor core 8.

In the prior art shown in FIG. 8, on the other hand, the commutator is fixedly fitted in such a state where the boss bottom 5 is brought into contact with the insulating core 10.

In order to make the position of the commutator the same in the prior art shown in FIG. 7 and that shown in FIG. 8, therefore, the relationship between the positioning length $A_1$ in the prior art shown in FIG. 7 and the positioning length $A_2$ in the prior art shown in FIG. 8 must be such that "$A_2 = A_1 + P$" (P is the thickness of the insulating core 10).

As described above, when manufacturing the rotor of the prior-art miniature motors, two types of rotor cores have had to be prepared depending on whether resin coating is applied to the rotor core or an insulating core is fitted. This has presented a problem in improving productivity.

SUMMARY OF THE INVENTION

It is an object of this invention to provide a rotor for miniature motors which solves the aforementioned problems.

It is another object of this invention to make it possible to use a rotor core having the laminates of the same thickness and the same commutator proper in either cases where resin coating is applied to the side surface of the rotor core, or where an insulating core is disposed.

It is still another object of this invention to provide a rotor for miniature motors in which the relative angular positional relationship between the rotor core and the commutator proper does not change even when the same rotor core and the same commutator proper are used, as described above.

These and other objects and advantages of this invention will become apparent from the following description taken in connection with FIGS. 1 through 4.

Figure 1A:
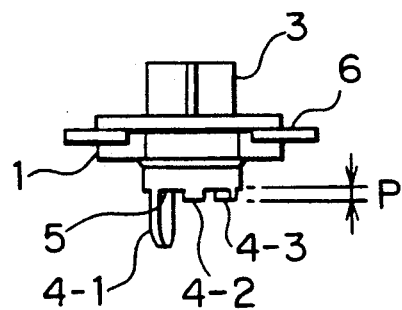
FIG. 1(A) is a front view of a commutator embodying this invention.

FIG.(A) is a front view of a prior-art commutator.

FIG. 5(B) is a bottom view of the commutator of FIG. 5(A).

FIG. 6(A) is a front view of a prior-art rotor core consisting oof a rotor core only.

FIG. 6(B) ia a partial side view of the rotor core shown in FIG. 6(A).

FIGS. 7 and 8 illustrate the state where the commutator of prior-art miniature motors is fixedly fitted.

DETAILED DESCRIPTION OF THE EMBODIMENT

An embodiment of this invention will be described, referring to FIGS. 1 through 4. In FIGS. 1 through 4, reference numeral 1 refers to a commutator or commutator body made of an insulating material; 2 to a shaft-inserting hole; 3 to a commutator segment; 4-1 to a long positioning boss; 4-2 and 4-3 to short positioning bosses; 5 to a boss bottom; 6 to a commutator terminal; 7 to a shaft; 8 to a rotor core with rotor windings; to a positioning groove provided on the rotor core 8; 10 to an insulating core fitted to the side surface of the rotor core 8 to protect rotor windings (not shown); 11-1 through 11-3 to positioning grooves provided on the insulating core 10; and 12 to resin coating, respectiively.

As shown in FIG. 1, the commutator according to this invention has essentially the same construction as the prior art shown in FIG. 5 described at the beginning of this Specification, except the construction of the positioning boss. That is, the commutator of this invention has such a construction that one of the positioning bosses is a long positioning boss 4-1 having a longer length, and the other positioning bosses are short positioning bosses 4-2 and 4-3 having the same length as the thickness P of the insulating core 10.

Figure 2A:
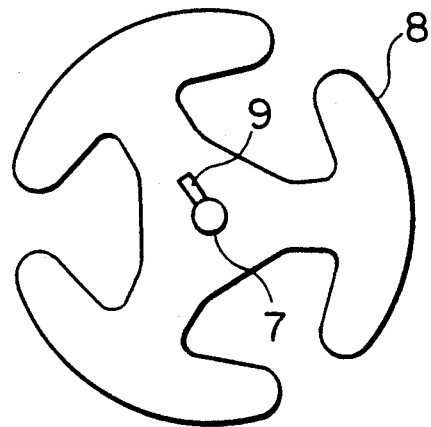
FIG. 2(A) is a front view where the rotor core of this invention consists of a rotor core only.

The positioing groove 9 provided on the rotor core 8 according to this invention is provided at only one location, as shown in FIG. 2 (A), to correspond with the long positioning boss 4-1.

Figure 3:
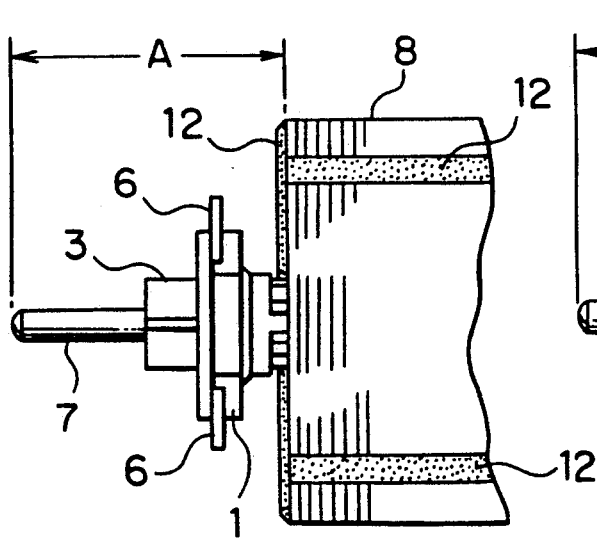
FIG. 3 is a side view of the essential part of a rotor core embodying this invention which consists of a rotor core only.

The embodiment shown in FIG. 3 is a rotor for miniature motors of this invention, to which resin coating 12 is applied, except on the outer circumferential surface of the rotor core 8 the outer circumferential surface standing opposed to a stator (not shown). That is, the embodiment shown in FIG. 3 is such that the commutator is fixedly fitted by inserting the shaft 7 into the shaft inserting hole 2 of the commutator shown in FIGS. 1(A) and 1(B), and press-fitting the long positioning boss 4-1 into the positioning groove 9 until the tips of the short positioning bosses 4-2 and 4-3 reach the side surface of the rotor core 8.

Figure 4:
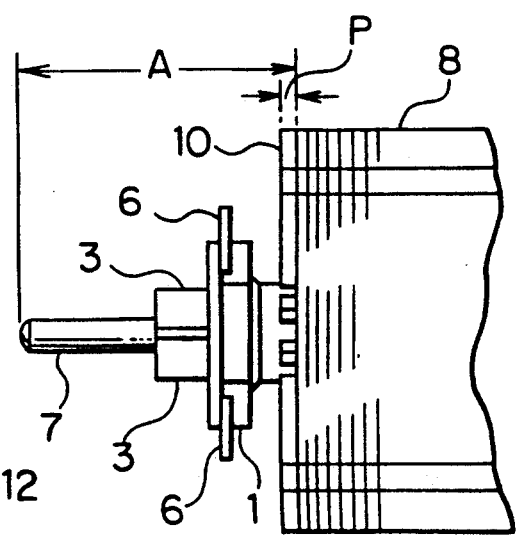
FIG. 4 is a side view of the essential part of a rotor core embodying this invention to which an insulating core is fitted.

The embodiment shown in FIG. 4 is a rotor for miniature motors according to this invention in which the insulating core 10 is fitted to the side surface of the rotor core 8. On the insulating core 10 provided are the positioning grooves 11-1 through 11-3 corresponding to the long positioning boss 4-1 and the short positioning bosses 4-2 and 4-3, as shown in FIG. 2(B). The embodiment shown in FIG. 4 is such that the commutator is fixedly fitted by inserting the shaft 7 into the shaft-inserting hole 2 of the commutator shown in FIGS. 1(A) and 1(B), passing the long positioning boss 4-1 and the short positioning bosses 4-2 and 4-3 through the positioning grooves 11-1 through 11-3, and press-fitting the long positioning boss 4-1 into the positioning groove 9 until the tips of the short positioning bosses 4-2 and 4-3 reaches the side surface of the rotor core 8 (the short boss having a thickness of an insulating core 10). As mentioned above, since the insulating core 10 in the embodiment shown in FIG. 4 has the positioning grooves 11-1 through 11-3 corresponding to the long positioning boss 4-1 and the short positioning bosses 4-2 and 4-3, not only the long positioning boss but also the short positioning bosses are engaged with the positioning grooves. This contributes to stabilizing the positioning of the commutator in the rotating direction.

As described above, the commutator is fixedly fitted by bringing the tips of the short positioning bosses 4-2 and 4-3 into contact with the side surface of the rotor core 8 in this invention. This makes the positioning length A in the embodiment shown in FIG. 4 equal to the positioning length A in the embodiment shown in FIG. 3, in which the resin coating 12 is applied to the rotor core 8. Thus, this invention makes it possible to use a rotor core of the same dimensions even if resin coating is applied to the rotor core, or an insulating core is fitted to the side surface of the rotor core 8.

Figure 1B:
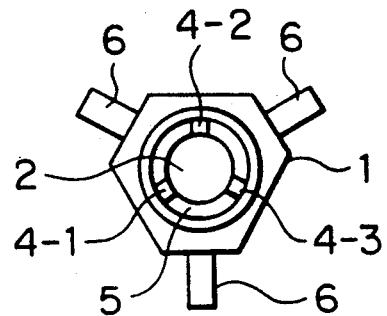
FIG. 1(B) is a bottom view of the commutator shown in FIG. 1(A).
Figure 2B:
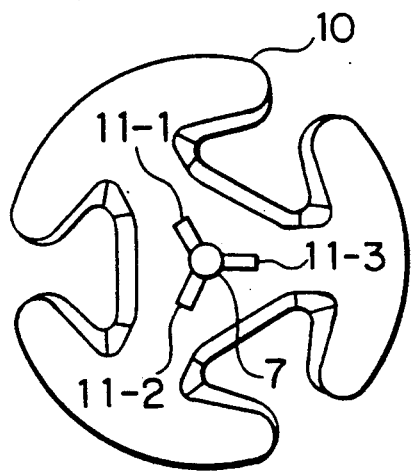
FIG. 2(B) is a front view where an insulating core is fitted to the rotor core.

In the embodiment shown in FIG. 1(A) and 1(B) the length of the short positioning bosses 4-2 and 4-3 equals to the thickness P of the insulting core 10. This invention, however, is not limited to this arrangement. That is, the length of the short positioning bosses 4-2 and 4-3 may be slightly longer than the thickness P of the insulating core 10.

As described above, this invention makes it possible to improve productivity in the manufacture of rotors for miniature motors since a rotor of the same dimensions can be used for miniature motors of different specifications, that is, miniature motors using resin coating applied to the rotor core, or an insulating core fitted to the rotor core.

What is claimed is:

1. A rotor for miniature motors having a shaft serving as a rotating shaft, a commutator having commutator terminals mounted on a commutator body, said commutator body being fixedly fitted to said shaft, a rotor core fixedly fitted to said shaft and having rotor windings wound thereon, a plurality of positioning bosses formed in such a manner as to protrude toward a side surface of said rotor core on said commutator body, and a positioning groove, formed on the side surface of said rotor core, into which at least one of said positioning bosses is inserted; said commutator being fixedly fitted by press-fitting said at least one of said positioning bosses into said positioning groove, said plurality of positioning bosses including a long positioning boss, having a sufficient length to be press-fitted into said positioning groove, said plurality of positioning bosses including short positioning bosses having a length at least equal to a thickness of an insulating core which may be fitted to the side surface of said rotor core;

said long positioning boss being press-fitted into said positioning groove, and said commutator is fixedly fitted to said shaft in a state where tips of said short positioning bosses are brought into contact with the side surface of said rotor core.

2. A rotor for miniature motors as set forth in claim (1) wherein said commutator comprises a hollow cylindrical member made of an insulating material, said commutator terminals being disposed on said hollow cylindrical member; said long positioning boss and said short positioning bosses are provided on an end face of said hollow cylindrical member opposite to an end where said commutator terminals are disposed in such a manner as to protrude from a boss bottom corresponding to said end face.

3. A rotor for miniature motors as set forth in claim (1) wherein an insultating core is provided on the side surface of said rotor core in such a manner as to cover said side surface, and positioning grooves through which said long positioning boss and said short positioning bosses are passed, are provided on said insulating core; said short positioning bosses being passed through said positioning grooves on said insulating core to reach the side surface of said rotor core.

4. A rotor for miniature motors as set forth in claim (1) wherein resin coating is applied to the side surface of said rotor core in such a manner as to cover said side surface, said rotor windings are wound on said rotor core to which said resin coating is applied; the tips of said short positioning bosses coming in contact with the side surface of said rotor core at a location where said resin coating does not exist.

5. A rotor for miniature motors, comprising: a shaft; a commutator including commutator segments mounted on a commutator body, said commutator body being fixedly fitted to said shaft; a rotor core fixedly fitted to such shaft, said rotor core including rotor windings wound thereon; a plurality of positioning bosses formed protruding from said commutator body toward a side surface of said rotor core, said plurality of bosses including a long positioning boss and a short positioning boss; a positioning groove formed on said side surface of said rotor core, said long positioning boss having a length which is greater than a length of said short positioning boss such that said long positioning boss is press-fitted into said positioning groove when a front surface of said short positioning boss is brought into abutting engagement with said side surface of said rotor core.

6. A rotor according to claim (5), further comprising an insulating core including insulating core positioning grooves, said long positioning boss passing through said positioning groove for press fitting into said positioning groove of said rotor core and said short positioning boss having a length substantially equal to a width of said insulating core such that when said short positioning boss abuts said side surface of said rotor core.

* * * * *